US012332722B2

(12) United States Patent
Phan et al.

(10) Patent No.: US 12,332,722 B2
(45) Date of Patent: Jun. 17, 2025

(54) LATENCY REDUCTION FOR TRANSITIONS BETWEEN ACTIVE STATE AND SLEEP STATE OF AN INTEGRATED CIRCUIT

(71) Applicants: Advanced Micro Devices, Inc., Santa Clara, CA (US); ATI Technologies ULC, Markham (CA)

(72) Inventors: Gia Tung Phan, Markham (CA); Randall Brown, Markham (CA); Ashish Jain, Austin, TX (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 63 days.

(21) Appl. No.: 18/189,993

(22) Filed: Mar. 24, 2023

(65) Prior Publication Data

US 2024/0319781 A1    Sep. 26, 2024

(51) Int. Cl.
 *G06F 1/32* (2019.01)
 *G06F 1/3228* (2019.01)
 (Continued)

(52) U.S. Cl.
 CPC .......... *G06F 1/3275* (2013.01); *G06F 1/3228* (2013.01); *G06F 1/3287* (2013.01)

(58) Field of Classification Search
 CPC ..... G06F 1/3275; G06F 1/3228; G06F 1/3287
 See application file for complete search history.

(56) References Cited

U.S. PATENT DOCUMENTS 5,974,512 A  10/1999 Chiba
6,057,862 A   5/2000 Margulis
       (Continued)

FOREIGN PATENT DOCUMENTS

EP    0955583 A2   11/1999
WO   00/33188 A2    6/2000
       (Continued)

OTHER PUBLICATIONS

Loh, et al., "A Processing-in-Memory Taxonomy and a Case for Studying Fixed-function PIM", In Near-Data Processing Workshop, 2013, 4 pages, http://www.cs.utah.edu/wondp/wondp2013-paper2-final.pdf. [Retrieved Dec. 17, 2015].

(Continued)

*Primary Examiner* — Zahid Choudhury
(74) *Attorney, Agent, or Firm* — Kowert, Hood, Munyon, Rankin & Goetzel, P.C.; Rory D. Rankin (57) ABSTRACT

An apparatus and method for efficient power management of multiple integrated circuits. In various implementations, a computing system includes an integrated circuit with a security processor. The security processor determines the integrated circuit transitions to an active state from a sleep state that is not intended to maintain configuration information to return to the active state without restarting an operating system. In the sleep state, multiple components of the integrated circuit have a power supply reference level turned off, which provides low power consumption for the integrated circuit. The security processor performs the bootup operation using information stored in persistent on-chip memory. By not using information stored in off-chip memory, the security processor reduces the latency of the transition. The persistent on-chip memory utilizes synchronous random-access memory that receives a standby power supply reference level that continually supplies a voltage magnitude by not being turned off.

20 Claims, 7 Drawing Sheets

(51) Int. Cl.
*G06F 1/3234* (2019.01)
*G06F 1/3287* (2019.01)

(56) References Cited

U.S. PATENT DOCUMENTS

| | | | |
|---|---|---|---|
| 6,349,346 B1* | 2/2002 | Hanrahan | G06F 15/7867 326/38 |
| 7,185,150 B1 | 2/2007 | Kogge | |
| 7,509,511 B1 | 3/2009 | Barowski et al. | |
| 9,268,627 B2 | 2/2016 | Kraipak et al. | |
| 9,767,028 B2 | 9/2017 | Cheng et al. | |
| 10,403,351 B1* | 9/2019 | Tsien | G11C 11/40611 |
| 2003/0028766 A1* | 2/2003 | Gass | G06F 21/572 713/193 |
| 2003/0041138 A1 | 2/2003 | Kampe et al. | |
| 2003/0191739 A1 | 10/2003 | Chatterjee et al. | |
| 2006/0294323 A1 | 12/2006 | Armstrong et al. | |
| 2006/0294337 A1 | 12/2006 | Hartung et al. | |
| 2012/0005243 A1 | 1/2012 | Van der Merwe et al. | |
| 2014/0047263 A1 | 2/2014 | Coatney et al. | |
| 2014/0254591 A1 | 9/2014 | Mahadevan et al. | |
| 2016/0055102 A1* | 2/2016 | de Cesare | H04L 9/002 713/193 |
| 2023/0094673 A1* | 3/2023 | Patel | G06F 21/602 713/193 |

FOREIGN PATENT DOCUMENTS

| | | |
|---|---|---|
| WO | 2006/091846 A2 | 8/2006 |
| WO | 2013/048536 A1 | 4/2013 |

OTHER PUBLICATIONS

International Search Report and Written Opinion in International Application No. PCT/US2019/018727, mailed May 14, 2019, 15 pages.

* cited by examiner

FIG. 1

Method 200

LATENCY REDUCTION FOR TRANSITIONS BETWEEN ACTIVE STATE AND SLEEP STATE OF AN INTEGRATED CIRCUIT

BACKGROUND

Description of the Relevant Art

Generally speaking, a variety of semiconductor chips include at least one integrated circuit, such as a processing unit, coupled to a memory. The processing unit processes instructions (or commands) by fetching instructions and data, decoding instructions, executing instructions, and storing results. The processing unit sends memory access requests to the memory for fetching instructions, fetching data, and storing results of computations. Examples of the processing unit are a central processing unit (CPU), an application specific integrated circuit (ASIC), a field programmable gate array (FPGA), a multimedia engine, and a processing unit with a highly parallel microarchitecture such as a graphics processing unit (GPU) and a digital signal processor (DSP). In some designs, the processing unit and the memory are on a same die such as a system-on-a-chip (SOC), whereas, in other designs, the processing unit and the memory are on different dies within a same package such as a multi-chip-module (MCM) or in a system in a package (SiP).

A variety of computing devices use the above examples of semiconductor chips with one or more integrated circuits. Examples of these computing devices are a desktop computer, a laptop computer, a server computer, a tablet computer, a smartphone, a gaming device, a smartwatch, and so on. As power consumption increases, more costly cooling systems such as larger fans and heat sinks are utilized to remove excess heat and prevent failure of the integrated circuit. However, cooling systems increase system costs. The power dissipation constraint of the integrated circuit is not only an issue for portable computers and mobile communication devices, but also for high-performance desktop computers and server computers. Power management circuitry assigns operating parameters to different partitions of an integrated circuit. The operating parameters include at least an operating power supply voltage and an operating clock frequency.

During a bootup operation prior to executing applications, several steps are performed such as verifying available hardware resources are functioning, loading a preferred operating system, and initializing one or more integrated circuits of the semiconductor chip. These steps follow an algorithm with instructions organized in small programs distributed across on-chip memory and within partitions of disk memory. Although a semiconductor chip can have no computational tasks to perform during a particular time period, the power management circuitry is unable to assign a sleep state, or other deep low-power state, to the semiconductor chip due to one or more components, such as particular one or more integrated circuits, consuming time to reinitialize when the sleep state ends. To avoid the duration of time for reinitializing these one or more components of the semiconductor chip, the power management circuitry limits the assigned low-power state.

In view of the above, methods and systems for efficiently managing power consumption of multiple components of an integrated circuit are desired.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently managing power consumption of multiple components of an integrated circuit are contemplated. In various implementations, a computing system includes an integrated circuit with a security processor. The security processor determines a condition is satisfied that includes initializing at least a given client of multiple clients of the integrated circuit. Examples of the condition are a cold bootup operation, a warm bootup operation, and a resume operation. The resume operation occurs when the security processor determines the integrated circuit transitions to an active state from a sleep state or a suspend state that is typically not intended to maintain configuration information for returning to the active state without aid from the operating system. When the integrated circuit transitions to the sleep state or suspend state, in some implementations, the operating system stores its context information in one or more of system memory (typically implemented with DRAM) and main memory (typically implemented with disk memory). In an implementation, the security processor stores boot firmware and at least a subset of configuration information of at least the given client in persistent on-chip memory. Following, the multiple components of the integrated circuit have a power supply reference level turned off, which provides low power consumption for the integrated circuit while in the suspend state.

When transitioning from the suspend state to the active state, if the security processor checks the persistent on-chip memory to determine whether a valid copy of boot firmware and at least a subset of configuration information of at least the given client is stored in the persistent on-chip memory. If so, then the security processor performs initialization steps during the resume time of at least the given client using the copy of this information. The security processor performs these initialization steps independent of interacting with one or more of the operating system and one or more drivers corresponding to one or more clients. In some implementations, the persistent on-chip memory has a limited size due to a limited amount of on-die area available for the persistent on-chip memory. In such implementations, the security processor also retrieves configuration information of at least the given client from the system memory (typically implemented with DRAM). By initializing at least the given client of multiple clients independent of interacting with one or more of the operating system and one or more drivers corresponding to one or more clients, the security processor reduces the resume time, which is the latency of the transition from the suspend state (or sleep state) to the active state. The security processor also ensures the multiple clients are ready for access by the operating system as soon as possible without the operating system initializing the clients. In implementations that have the security processor access only the persistent on-chip memory when initializing at least the given client, the security processor further reduces the resume time.

In an implementation, the persistent on-chip memory utilizes one of a variety of types of on-chip synchronous random access memory (SRAM) that receives a standby power supply reference level that is not turned off. The standby power supply reference level is directly connected to a power plane that provides the standby power supply reference level from a power supply unit. There are no power switches used for connecting and disconnecting the standby power supply reference level. The standby power supply reference level continually supplies a voltage magnitude to the persistent on-chip memory. Therefore, the persistent on-chip memory continually stores at least a subset of boot firmware and a subset of configuration information even during the sleep state. In another implementation, the standby power supply reference level is turned off after a threshold amount of time has elapsed. A programmable configuration register stores a value indicating the threshold amount of time. The power controller 146 uses this value to determine whether to turn off the standby power supply reference level. Further details of these techniques to reduce the resume time of the integrated circuit for further power consumption reduction are provided in the following description of FIGS. 1-7.

Figure 1:
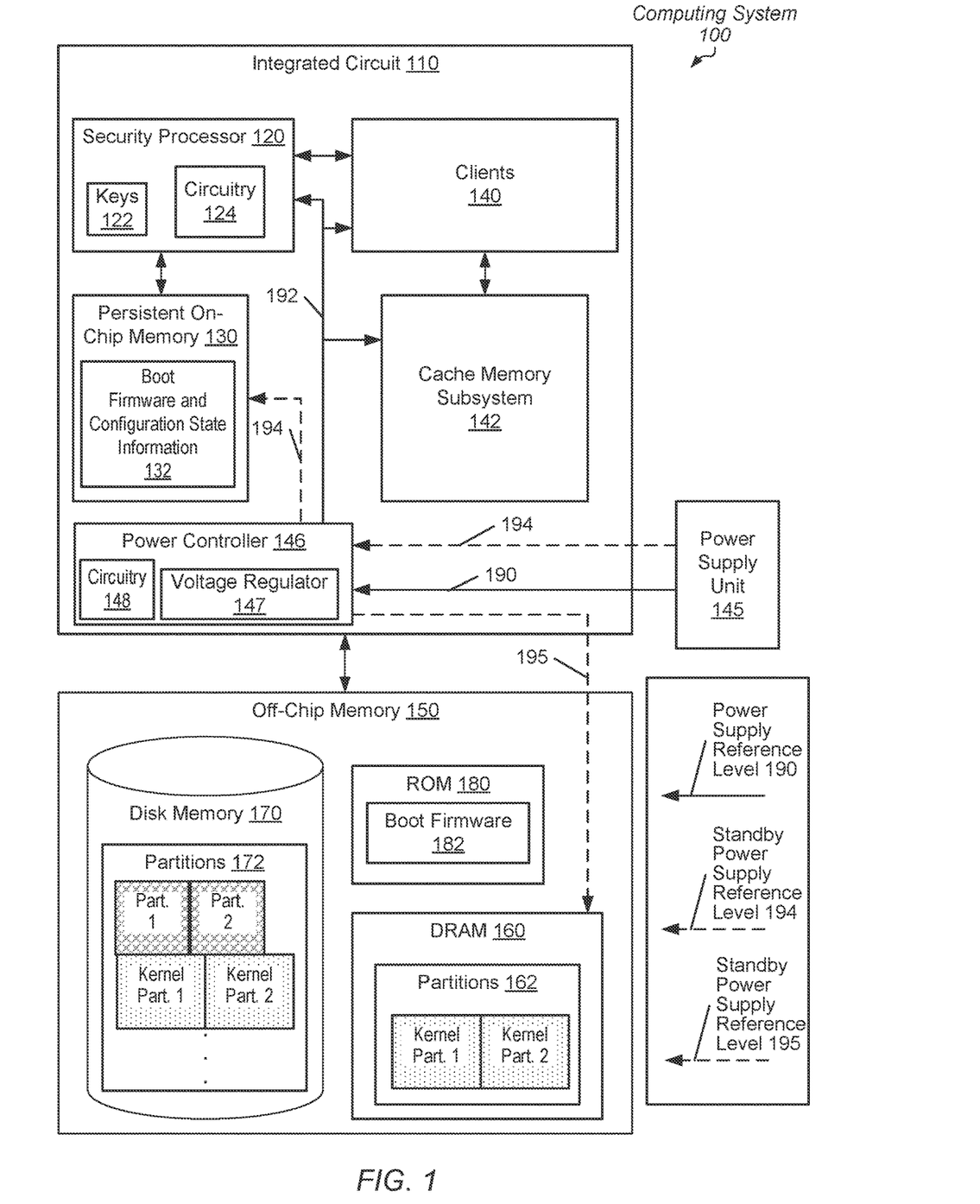
FIG. 1 is a generalized block diagram of computing system that efficiently manages power consumption of multiple components of an integrated circuit.

Referring to FIG. 1, a generalized block diagram is shown of a computing system 100 that efficiently manages power consumption of multiple components of an integrated circuit. An integrated circuit 110 includes at least a security processor 120, persistent on-chip memory 130, clients 140, and a separate cache memory subsystem 142. The integrated circuit 110 is connected to off-chip memory 150. The off-chip memory 150 includes at least dynamic random-access memory (DRAM) 160 and disk memory 170. The disk memory 170 includes one or more of hard disk drives (HDDs) and solid-state disks (SSDs). Clock sources, such as phase lock loops (PLLs), an interrupt controller, a communication fabric, power controllers, memory controllers, interfaces for input/output (I/O) devices, one or more temperature sensors and current sensors, and so forth are not shown in the computing system 100 for ease of illustration. It is also noted that the number of components of the computing system 100 and the number of subcomponents for those shown in FIG. 1 can vary from implementation to implementation. There can be more or fewer of each component/subcomponent than the number shown for the computing system 100.

In various implementations, the components of the integrated circuit 110 are on a same die such as a system-on-a-chip (SOC). In other implementations, the components are individual dies in a system-in-package (SiP) or a multi-chip module (MCM). A variety of computing devices use the integrated circuit 110 such as a desktop computer, a laptop computer, a server computer, a tablet computer, a smartphone, a gaming device, a smartwatch, and so on. The clients 140 include a variety of types of circuits such as a central processing unit (CPU), a digital signal processor (DSP), a graphics processing unit (GPU), an application specific integrated circuit (ASIC), a field programmable gate array (FPGA), a multimedia engine, and so forth. Each of the clients 140 is capable of processing tasks of a variety of workloads. Additionally, each of the clients 140 is capable of generating and servicing one or more of a variety of requests such as memory access read and write requests and cache snoop requests.

The cache memory subsystem 142 includes one or more levels of a hierarchical memory subsystem using a slower type of memory than registers, but a faster type of memory than the DRAM 160 and the disk memory 170 of the off-chip memory 150. In an implementation, one or more levels of the cache memory subsystem 142 utilizes one of a variety of types of on-chip synchronous RAM (SRAM). The cache memory subsystem 142 stores a copy of a subset of the data stored in the off-chip memory 150, and reduces latencies of memory requests generated by the clients 140, the security processor 120, and any other types of circuitry within the integrated circuit 110.

Compared to memory bit cells, such as 6T (six transistor) bit cells, used in the on-chip SRAM, the DRAM 160 that implements the system memory of computing system 100 reaches higher densities. Unlike HDDs and flash memory, the DRAM 160 is volatile memory, rather than non-volatile memory. The DRAM 160 loses its data relatively quickly when a power supply is removed. The disk memory 170 includes one or more of hard disk drives (HDDs) and solid-state disks (SSDs). The read only memory (ROM) 180 utilizes one of a variety of types of ROM for storing either data that remains unmodified or data that is modified during particular events rather than as part of typical processing of tasks of a workload. In an implementation, the ROM 180 is one of a variety of non-volatile memories. In an implementation, the ROM 180 cannot be electronically modified after the manufacture of the memory device used to implement the ROM 180. In other implementations, the ROM 180 utilizes one of erasable programmable read-only memory (EPROM), electrically erasable programmable read-only memory (EEPROM), and flash memory that can be erased and re-programmed. The ROM 180 stores instructions of software that is rarely changed such as one of a variety of types of firmware. For example, the ROM 180 stores boot firmware 182.

In some implementations, the security processor 120 includes the circuitry of a processor core of a multi-core processor. In other implementations, the security processor 120 includes the circuitry of a stand-alone (not a core of multiple cores), dedicated unit or processor or other type of circuit. In an implementation, the persistent on-chip memory 130 utilizes one of a variety of types of on-chip synchronous RAM (SRAM). Although the persistent on-chip memory 130 uses SRAM, the persistent on-chip memory 130 is not used as part of the cache memory subsystem 142. In various implementations, the persistent on-chip memory 130 stores a subset of information stored in one or more of the ROM 180 and the security processor 120. For example, the persistent on-chip memory 130 stores the boot firmware and configuration information 132 that is a subset of boot firmware 182 and any configuration information stored in one or more of the ROM 180 and the security processor 120.

Being non-volatile, the persistent on-chip memory 130 retains stored data regardless of whether the integrated circuit 110 is powered on or powered off such a being disconnected from the power supply reference level 192. To implement the persistent on-chip memory 130 as non-volatile memory while also using one of a variety of types of SRAM, the persistent on-chip memory 130 receives the standby power supply reference level 194 that is not turned off by the power supply unit 145 or the power controller 146. In an implementation, the other circuitry of the integrated circuit 110, such as at least the security processor 120, the clients 140, and the cache memory subsystem 142, receive the power supply reference level 192. The power controller 146 generates the power supply reference level 192, which is based on the power supply reference level 190 received from the power supply unit 145. It is possible for the power controller 146 to turn off the power supply reference level 192.

In various implementations, the persistent on-chip memory 130 uses a pair of voltage planes, and the pair includes the standby power supply reference level 194 as a first power plane and a standby ground reference level as a second power plane. Each of these power planes is separate from power planes used by other circuitry of the integrated circuit 110. In other implementations, only one ground reference level is used, rather than two or more ground reference levels, by the integrated circuit 110. In yet other implementations, a virtual ground reference level is used within the integrated circuit 110, and this virtual ground reference level is connected to a physical ground reference level through a sleeper gate such as a field effect transistor. In such an implementation, the persistent on-chip memory 130 receives the physical ground reference level, whereas, the other circuitry of the integrated circuit 110 receives the virtual ground reference level.

In various implementations, the power supply reference level 192 is connected to a power plane that provides the power supply reference level 190 from the power supply unit 145 through power switches which allows the power supply reference level 192 to be removed from supplying any voltage magnitude to the other circuitry of the integrated circuit 110. The other circuitry includes at least the security processor 120, the clients 140, and the cache memory subsystem 142. Conversely, the standby power supply reference level 194 is directly connected to a power plane that provides the standby power supply reference level 194 from the power supply unit 145. The standby power supply reference level 194 continually supplies a voltage magnitude to the persistent on-chip memory 130.

Although a single power supply reference level 192 is shown, in other implementations, any number of power supply reference levels are generated by the voltage regulator 147 for use by the other circuitry of the integrated circuit 110 such as at least the security processor 120, the clients 140, and the cache memory subsystem 142. Similarly, although a single power supply reference level 190 is shown being sent by the power supply unit 145, in other implementation, another number of power supply reference levels are sent from the power supply unit 145. In various implementations, the circuitry 148 of the power controller 146 determines one of multiple available voltage magnitudes to use for the power supply reference level 192. For example, the circuitry 148 selects a particular voltage magnitude based on a selected performance state (P-state). The circuitry 148 selects the P-state based on determining a power domain for one or more components of the integrated circuit 110. Each power domain includes operating parameters such as at least an operating power supply voltage and an operating clock frequency. Each power domain also includes control signals for enabling and disabling connections to clock generating circuitry and a power supply reference level. In some implementations, the voltage magnitude provided by the standby power supply reference level 194 is based on reducing leakage current of devices (transistors) within the persistent on-chip memory 130.

As shown, the ROM 180 stores boot firmware 182. As used herein, "firmware" includes instructions of an algorithm to be executed by circuitry to perform low-level tasks. An example of a low-level task is performing initial steps of a bootup operation. There are multiple types of the bootup operation. A cold bootup operation occurs when the computing device has been switched off, or otherwise had its power supply removed. A warm bootup operation occurs when the computing device maintains connection to its power supply without interruption, but the user restarts the computing device through a provided command or a particular input key sequence on the keyboard. Another example of a low-level task is performing initializing steps during resume time, which is the latency of the transition from the suspend state (or sleep state) to the active state. These initialization steps occur when the circuitry 124 of the security processor 120 determines the integrated circuit 110 transitions to an active state from a sleep state (or suspend state). Therefore, boot firmware and configuration information need to be maintained, such as stored in the on-chip memory 130, for the security processor 120 to perform these initialization steps independent of interacting with one or more of the operating system and one or more drivers corresponding to one or more of the clients 140. This sleep state (or suspend state) provides more power consumption reduction than other idle states, but at a cost of higher latency to perform the transition to the active state from the sleep state. This latency to perform the transition to the active state from the sleep state is also referred to as the "resume time" for the integrated circuit 110.

When the power controller 146 determines the security processor 120, the clients 140, and the cache memory subsystem 142 transition to one of multiple idle states, the power supply reference level 192 remains turned on although at a smaller voltage magnitude than a voltage magnitude used by the active state. In each of the multiple idle states, one or more clients of the clients 140 maintain configuration information. Consequently, the integrated circuit 110 can return to the active state without restarting the operating system to obtain the configuration information used to initialize one or more clients of the clients 140. In some implementations, the idle states of the integrated circuit 110 are states of the Advanced Configuration and Power Interface (ACPI) standard. In other implementations, the idle states of the integrated circuit 110 are states of another standard.

In contrast, when the power controller 146 determines the integrated circuit 110 transitions to the sleep state (or suspend state), the power supply reference level 192 is turned off, or the power supply reference level 192 is disconnected by power switches from a physical power plane. In the sleep state, the one or more clients of the clients 140 do not maintain configuration information. Consequently, to return to the active state, the integrated circuit 110 typically relies on the operating system to obtain the configuration information used to initialize the one or more clients of the clients 140. Having the operating system perform the resume operation (the initialization steps for the clients 140) provides a high latency to transition from the sleep state to the active state. In other words, the resume time is appreciably large. Therefore, the power controller 146 typically avoids using the sleep state on a regular basis although the sleep state provides lower power consumption than the idle states.

To reduce the latency of transitioning from the sleep state to the active state (or reduce the resume time for the integrated circuit 110), the circuitry 124 of the security processor 120 stores a subset of the boot firmware 182 in the persistent on-chip memory 130 as information 132. Additionally, the security processor 120 stores, in the persistent on-chip memory 130 as information 132, a subset of configuration information used to initialize one or more clients of the clients 140. In some implementations, the configuration information is for a client such as a parallel data processing unit that includes a graphics processing unit (GPU), a parallel data accelerator, a shader engine, or other. The configuration information, which is also referred to as context information, is used by a corresponding driver, such as a video graphics card driver or other type of driver, to initialize the client.

Initialization steps include one or more of setting up a frame buffer with a particular size and address range, setting up power management parameters to emphasize high performance or power consumption reduction, setting up modes of operation such as a default to a maximum operating clock frequency for all workloads or select the operating clock frequency based on a type of workload, setting up configuration and status registers with values corresponding to a resolution supported by a connected display device, identifying a particular version of a software toolkit or platform used to support applications that run on the client and aid the client to utilize commands from another client, identifying a particular bus interface and corresponding communication protocol parameters for accessing memory and/or communication with another client, and so forth. The types of workloads for the parallel data processing unit include parallelized floating-point calculations for machine learning (implementing neural networks), fast Fourier transforms for high-performance computing, and general-purpose computing on graphics processing units (GPGPU) applications.

The types of workloads for the parallel data processing unit also include rendering video pixel data of three-dimensional (3-D or 3D) visual content, and video shading during rendering. Examples of platforms are OpenCL (Open Computing Language), OpenGL (Open Graphics Library) and OpenGL for Embedded Systems (OpenGL ES), are used for running programs on GPUs from AMD, Inc. The applications are written by designers in a chosen higher-level language (e.g., C, C++, FORTRAN, and Java), and then partially processed with the aid of graphic libraries with their own application program interfaces (APIs) based on the identified platform. It is possible and contemplated that the configuration information for the parallel data processing unit of the clients 140 includes other types of information and additional types of information than the above listed examples.

To reduce the latency of transitioning the integrated circuit 110 from the sleep state to the active state, the circuitry 124 of the security processor 120 stores, in the persistent on-chip memory 130 as information 132, at least a subset of the configuration information for the parallel data processing unit of the clients 140. It is also possible and contemplated that the security processor 120 stores as information 132 in the persistent on-chip memory 130 other configuration information corresponding to other types of clients of clients 140. In some implementations, the security processor 120 stores information in the persistent on-chip memory 130 after previously authenticating the information. Since the security processor 120 is the only component of the integrated circuit 110 that accesses the persistent on-chip memory 130, in some implementations, the security processor 120 does not generate any hash values or execute any encryption algorithms when storing information in the persistent on-chip memory 130. In such implementations, the keys 122 are used for protecting and authenticating other information, but not for information read out of the persistent on-chip memory 130. The lack of decrypting information stored in the persistent on-chip memory 130 further reduces the resume time, which is the latency of transitioning from the sleep state to the active state (or performing the resume operation).

As shown, each of the DRAM 160 and the disk memory 170 of the off-chip memory 150 stores a copy of multiple partitions. For example, the disk memory 170 stores the partitions 172, and the DRAM 160 stores the partitions 162. Each one of the partitions 172 is used as if it was a separate hard disk by the operating system and corresponding file system. Partitioning the disk memory 170 allows multiple operating systems and file systems to have information stored on the disk memory 170. Each operating system and each file system within a respective operating system uses a corresponding partition independently from other operating systems and other file systems. Without partitions, a separate disk memory can be used for each separate operating system and each separate mounted file system. The number of partitions and the content of each of the partitions in partitions 172 follows either the MBR standard (that uses BIOS as boot firmware) or the GPT standard (that uses UEFI as boot firmware). There are at least two standards used to define how information used during a bootup operation is stored on the computing system 100. A first standard uses a master boot record (MBR) and boot firmware referred to as basic input/output system (BIOS). A second standard uses the globally unique identifiers (GUID) partition table (GPT) and boot firmware referred to as unified extensible firmware interface (UEFI).

The partitions 172 are shown to include at least "Part. 1" (Partition 1), "Part. 2" (Partition 2), "Kernel Part. 1" (Kernel Partition 1), and "Kernel Part. 2" (Kernel Partition 2). These partitions can represent a variety of primary partitions, partitions with a root directory and one or more boot loaders for loading and running components of a particular operating system, partitions that include files and small programs to setup one or more file systems and/or one or more subdirectories of a particular file system, and so forth. During a resume operation, the security processor 120 inspects a flag that indicates whether the persistent on-chip memory 130 stores valid information. In some implementations, the flag is a data (e.g., one or more bits) stored in a particular storage location of the persistent on-chip memory 130 that indicates whether other storage locations of the persistent on-chip memory 130 stores valid information. In other implementations, the flag is stored in a register type implementation or multiple bits with error correction code (ECC) defending against data corruption.

When the security processor 120 determines the flag indicates that the persistent on-chip memory 130 stores valid information, the security processor 120 retrieves instructions of boot firmware of information 132 and runs it. Otherwise, if the security processor 120 determines the flag indicates that the persistent on-chip memory 130 stores invalid information, then the security processor 120 retrieves instructions of boot firmware 182 stored in the ROM 180 and runs it after authentication using the keys 122. The steps of the boot firmware include performing one or more of a hardware discovery of computing system 100, determining which I/O devices are bootable, determining whether any hardware resources are malfunctioning by performing a power-on self-test (POST), checking for custom or updated settings, loading the interrupt handlers and device drivers, initializing power management, displaying system settings, and loading initial programs of a bootstrap sequence. The algorithm defined by the boot firmware loads programs from a selected one of the partitions 172. During the bootup operation, copies of selected partitions (or subsets of the selected partitions) are loaded from disk memory 170 and stored on the DRAM 160 and the cache memory subsystem 142.

When the security processor 120 determines the flag indicates that the persistent on-chip memory 130 stores valid information, the security processor 120 is also capable of performing initializing steps, during resume time, independent of interacting with one or more of the operating system and one or more drivers corresponding to one or more of the clients 140. Examples of the initialization steps were provided earlier. In some implementations, the persistent on-chip memory 130 has a limited size due to a limited amount of on-die area available in the integrated circuit 110 for the persistent on-chip memory 130. The limited size prohibits the security processor 120 from storing all of the required configuration information in the persistent on-chip memory 130. In such implementations, when transitioning to the suspend state, the security processor 120 also stores, in the system memory (the DRAM 160), a subset of one or more of the boot firmware 182 and the configuration information for one or more of the clients 140. This subset of information is unable to be stored in the persistent on-chip memory 130 with its limited size. The memory locations of a particular region of the DRAM 160 is accessible by only the security processor 120, and this region is used to store the subset of information. In such implementations, the power controller 146 generates the standby power supply reference level 195 that is not turned off by the power supply unit 145 or the power controller 146. The DRAM 160 receives the standby power supply reference level 195. Therefore, in the suspend state, each of the persistent on-chip memory 130 and the DRAM 160 continue to receive a power supply reference level.

During the resume time, the security processor 120 retrieves information from each of the persistent on-chip memory 130 and the DRAM 160 to perform initialization steps of the resume operation independent of interacting with one or more of the operating system and one or more drivers corresponding to one or more of the clients 140. In some implementations, the power controller 146 includes programmable configuration registers that stores a first value indicating a first threshold amount of time and a second value indicating a second threshold amount of time. The power controller 146 uses the first threshold amount of time to determine whether to turn off the standby power supply reference level 194. For example, when a measurement of the idle time since the suspend state began reaches or exceeds the first threshold amount of time, the power controller 146 turns off the standby power supply reference level 194. Therefore, power switches are used in this implementation for the standby power supply reference level 194. Turning off the standby power supply reference level 194 causes the persistent on-chip memory 130 to lose its stored information, but it also further reduces power consumption during the suspend state.

In a similar manner, the power controller 146 uses the second threshold amount of time to determine whether to turn off the standby power supply reference level 195. For example, when a measurement of the idle time since the suspend state began reaches or exceeds the second threshold amount of time, the power controller 146 turns off the standby power supply reference level 195. Therefore, power switches are used in this implementation for the standby power supply reference level 195. Turning off the standby power supply reference level 195 causes the DRAM 160 to lose its stored information, but it also further reduces power consumption during the suspend state. In another implementation, the power controller 146 uses a single threshold amount of time for both the persistent on-chip memory 130 and the DRAM 160. In yet another implementation, each of the persistent on-chip memory 130 and the DRAM 160 includes circuitry that measures the idle time since the suspend state began, stores a value indicating a threshold amount of time for comparing to the measured idle time, and turning off a respective one of the standby power supply reference levels 194 and 195. When both of the standby power supply reference levels 194 and 195 are turned off, as described earlier, during a later resume operation, the secure processor 120 retrieves a copy of the boot firmware 182 from the ROM 180 to initialize the clients 140.

Figure 2:
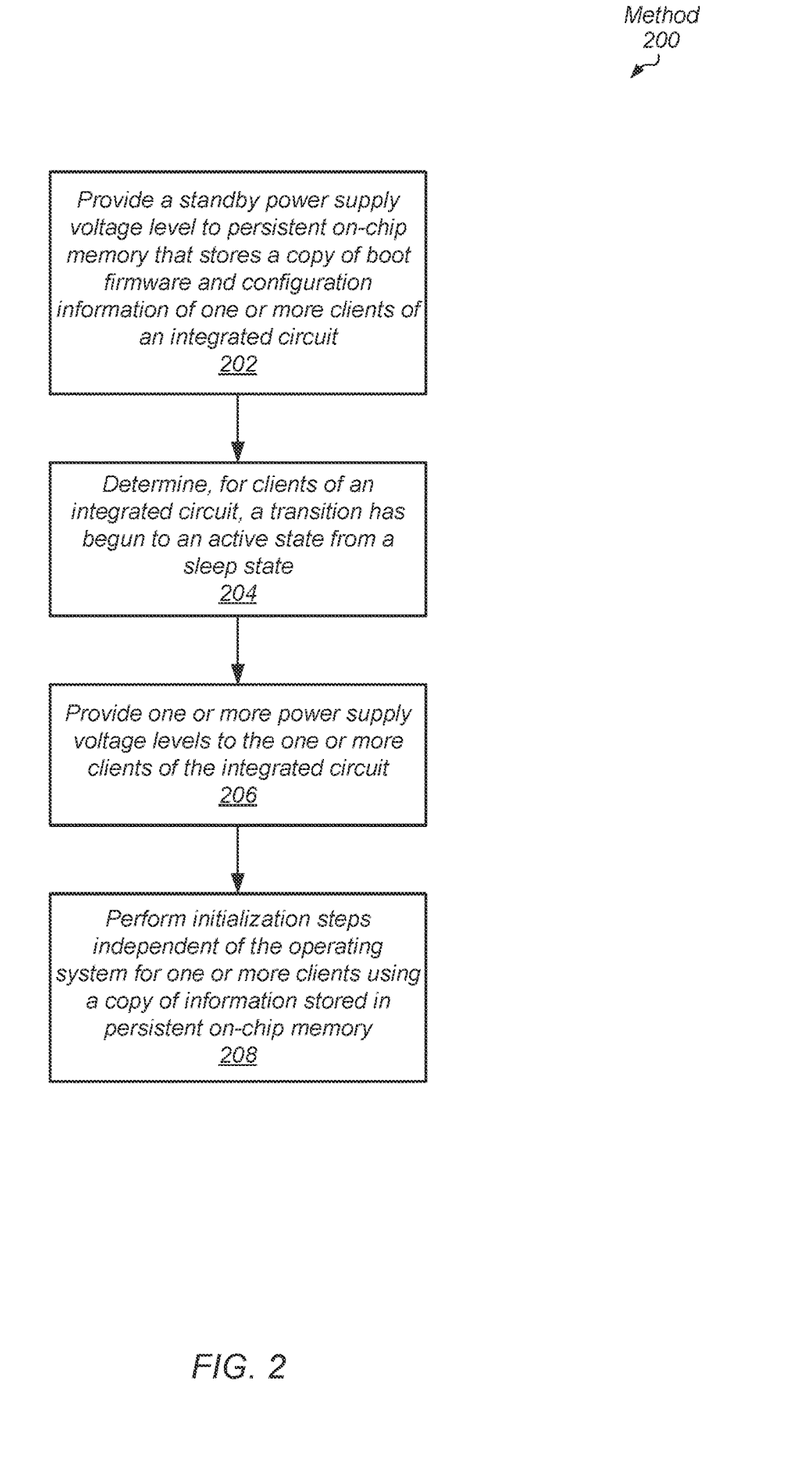
FIG. 2 is a generalized block diagram of a method for efficiently managing power consumption of multiple components of an integrated circuit.

Referring now to FIG. 2, a generalized block diagram is shown of a method 200 for efficiently managing power consumption of multiple components of an integrated circuit. For purposes of discussion, the steps in this implementation (as well as in FIGS. 3-4 and 6-7) are shown in sequential order. However, in other implementations some steps occur in a different order than shown, some steps are performed concurrently, some steps are combined with other steps, and some steps are absent.

A voltage regulator provides a standby power supply voltage level to persistent on-chip memory that stores a copy of boot firmware and configuration information of one or more clients of an integrated circuit (block 202). In various implementations, the standby power supply voltage level is directly connected to a power plane with no power switches being used. Therefore, the standby power supply voltage level cannot be turned off for the persistent on-chip memory. Additionally, the persistent on-chip memory utilizes one of a variety of types of on-chip SRAM. A power manager determines, for clients of an integrated circuit, a transition has begun to an active state from a sleep state (block 204). In the sleep state, in some implementations, the power manager had turned off power supply reference levels to the one or more clients by sending particular control signals to power switches. Turning off the power supply reference levels provides low power consumption for the integrated circuit while in the sleep state (or suspend state).

To transition to the active state, the power manager provides one or more power supply voltage levels to the one or more clients of the integrated circuit (block 206). The power manager returns to providing one or more power supply reference levels to the one or more clients by sending particular control signals to power switches. A security processor performs a resume operation by initializing, independent of the operating system, one or more clients using a copy of information stored in persistent on-chip memory (block 208). For example, the security processor performs these initialization steps of the resume operation independent of interacting with one or more of the operating system and one or more drivers corresponding to one or more clients. The copy of the information includes at least a subset of boot firmware and a subset of configuration information used to initialize at least one client of multiple clients of the integrated circuit. Accessing this information from the persistent on-chip memory, rather than from one of a variety of types of off-chip memory, reduces the latency for transitioning the integrated circuit from the sleep state to the active state. However, in other implementations, a subset of this information is stored in the system memory, which receives a standby power supply reference level. In yet other implementations, one or more of the persistent on-chip memory and the system memory has its standby power supply reference level turned off when a measurement of an idle time since the suspend state began reaches or exceeds a threshold amount of time.

Figure 3:
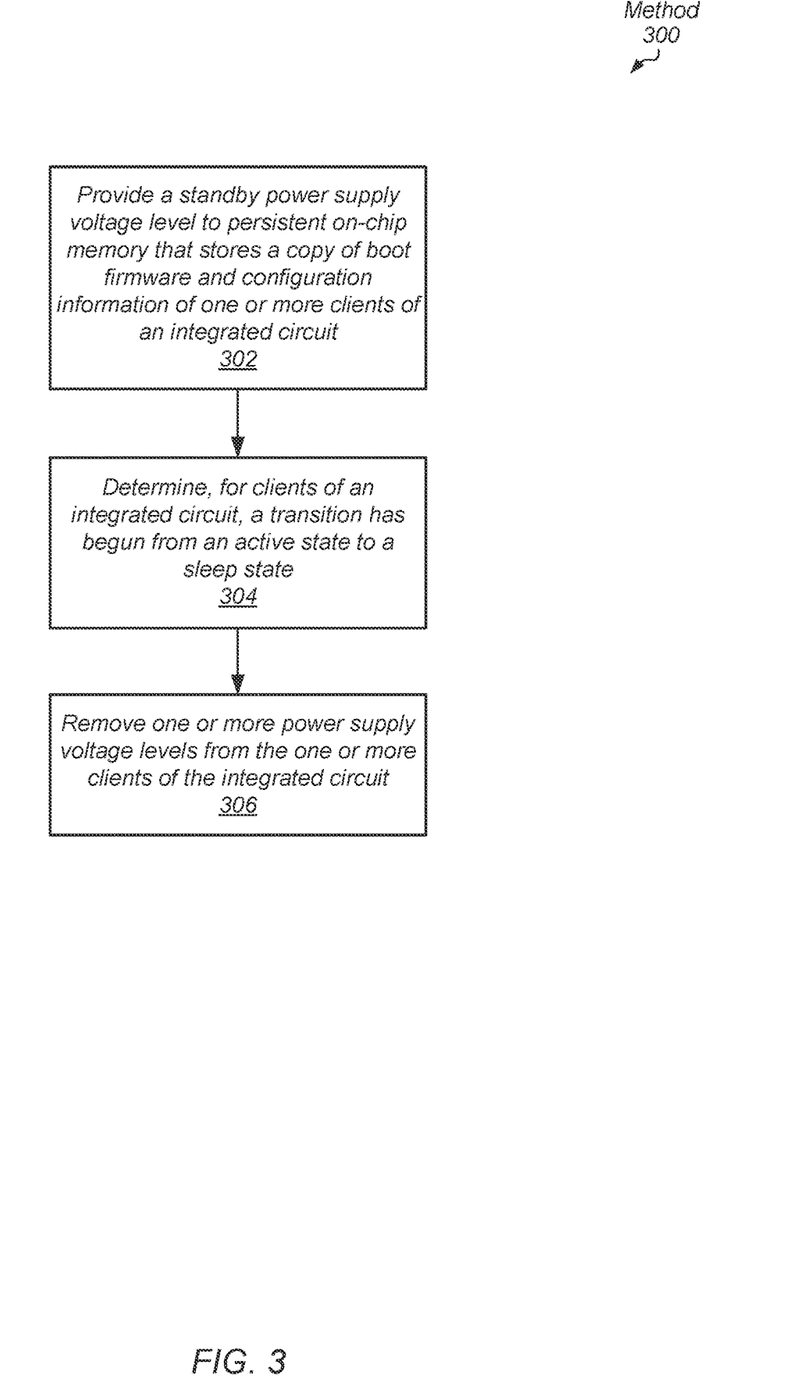
FIG. 3 is a generalized block diagram of a method for efficiently managing power consumption of multiple components of an integrated circuit.

Turning now to FIG. 3, a generalized block diagram is shown of a method 300 for efficiently managing power consumption of multiple components of an integrated circuit. A voltage regulator provides a standby power supply voltage level to persistent on-chip memory that stores a copy of boot firmware and configuration information of one or more clients of an integrated circuit (block 302). In various implementations, the standby power supply voltage level cannot be turned off for the persistent on-chip memory, since the standby power supply voltage level is directly connected to a power plane with no power switches being used. Additionally, the persistent on-chip memory utilizes one of a variety of types of on-chip SRAM. A power manager determines, for clients of an integrated circuit, a transition has begun to a sleep state from an active state (block 304).

To transition to the sleep state (or suspend state), the power manager turns off each of one or more power supply voltage levels to the one or more clients of the integrated circuit (block 306). In an implementation, the power manager sends particular control signals to power switches to turn off the power supply reference levels. Turning off the power supply reference levels provides low power consumption for the integrated circuit while in the sleep state. In addition, the operating system saves its context information in one or more of system memory (typically implemented by DRAM) and main memory (typically implemented by disk memory). The security processor stores boot firmware and configuration information of one or more clients in the persistent on-chip memory, if this information is not already stored. In some implementations, the persistent on-chip memory has a limited size due to a limited amount of on-die area available for the persistent on-chip memory. In such implementations, the security processor also stores a subset of one or more of the boot firmware and the configuration information of the clients in the system memory.

Figure 4:
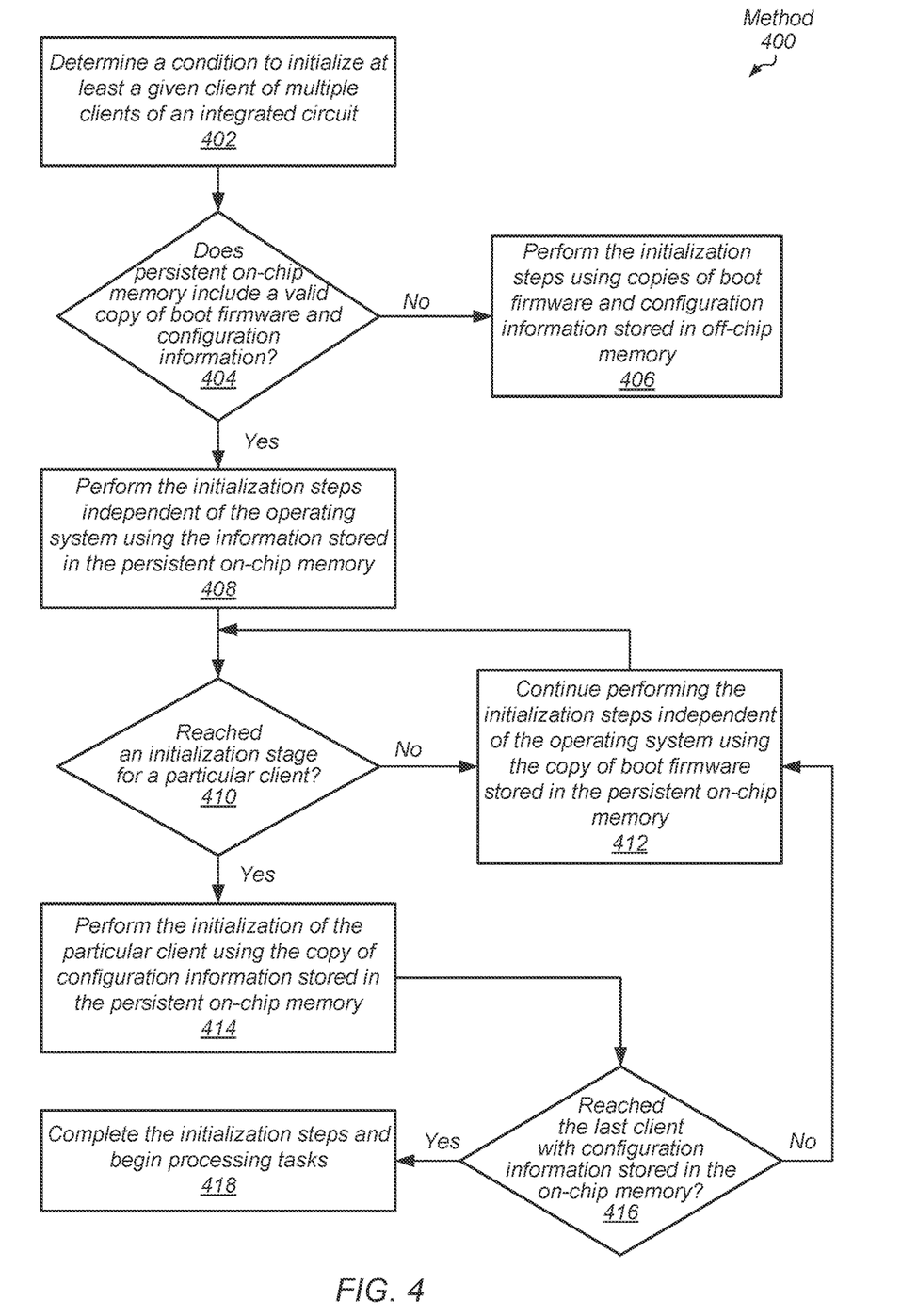
FIG. 4 is a generalized block diagram of a method for efficiently managing power consumption of multiple components of an integrated circuit.

Referring to FIG. 4, a generalized block diagram is shown of a method 400 for efficiently managing power consumption of multiple components of an integrated circuit. A security processor determines a condition to initialize at least a given client of multiple clients of an integrated circuit (block 402). Examples of the condition are a cold bootup operation, a warm bootup operation, and a resume operation.

If the security processor determines that the persistent on-chip memory does not include a valid copy of boot firmware and configuration information ("no" branch of the conditional block 404), then the security processor performs the initialization steps using copies of boot firmware and configuration information stored in one of a variety of types of off-chip memory (block 406). To do so, in this case, the security processor interacts with one or more of the operating system and one or more drivers corresponding to one or more clients to locate the configuration information. In other words, the security processor is unable to independently perform the initialization steps. However, if the security processor determines that the persistent on-chip memory includes a valid copy of at least a subset of boot firmware and a subset of configuration information ("yes" branch of the conditional block 404), then the security processor performs the initialization steps independent of the operating system and the one or more drivers corresponding to one or more clients by using the copy of boot firmware stored in the persistent on-chip memory (block 408).

If the security processor determines an initialization stage for a particular client has not been reached ("no" branch of the conditional block 410), then the security processor continues performing the initialization steps independent of the operating system using the copy of boot firmware stored in the persistent on-chip memory (block 412). If the security processor determines an initialization stage for a particular client has been reached ("yes" branch of the conditional block 410), then the security processor performs the initialization of the particular client independent of the operating system using the copy of configuration information stored in the persistent on-chip memory (block 414). In an implementation, the particular client is a parallel data processing unit, and the subset of configuration information includes information for performing initialization steps such as setting up a frame buffer with a particular size and address range, setting up power management parameters to emphasize high performance or power consumption reduction, setting up modes of operation such as a default to a maximum operating clock frequency for all workloads or select the operating clock frequency based on a type of workload, setting up configuration and status registers with values corresponding to a resolution supported by a connected display device, identifying a particular version of a software toolkit or platform used to support applications that run on the client and aid the client to utilize commands from another client, identifying a particular bus interface and corresponding communication protocol parameters for accessing memory and/or communication with another client, and so forth.

If the security processor determines that the last client with configuration information stored in the persistent on-chip memory has not been reached ("no" branch of the conditional block 416), then control flow of method 400 returns to block 412 where the security processor continues performing the initialization steps independent of the operating system using the copy of boot firmware stored in the persistent on-chip memory. If the security processor determines that the last client with configuration information stored in the persistent on-chip memory has been reached ("yes" branch of the conditional block 416), then the security processor completes the initialization steps independent of the operating system and the one or more clients begin processing tasks (block 418). For example, the operating system accesses the one or more clients and assigns tasks.

Figure 5:
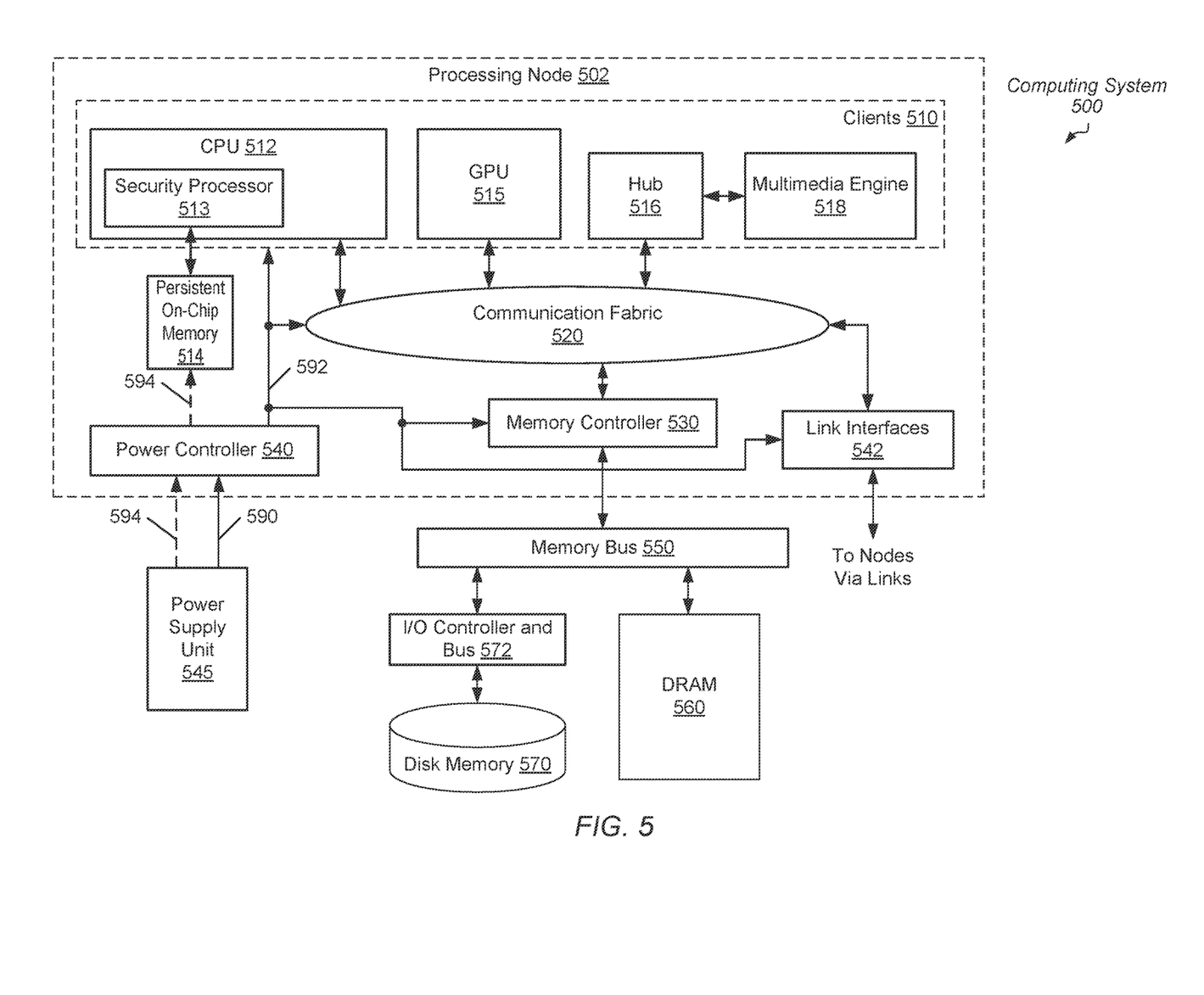
FIG. 5 is a generalized block diagram of computing system that efficiently manages power consumption of multiple components of an integrated circuit.

Referring to FIG. 5, a generalized block diagram is shown of a computing system 500 that supports providing access to reliable boot firmware. As shown, the computing system 500 includes the processing node 502. Although a single processing node is shown, it is possible and contemplated that the computing system 500 includes another number of processing nodes based on design requirements. The processing node 502 includes communication fabric 520 between each of clients 510, memory controller 530, power controller 540 and link interfaces 542. In some implementations, the components of processing node 502 are individual dies on an integrated circuit (IC), such as a system-on-a-chip (SOC). In other implementations, the components are individual dies in a system-in-package (SiP) or a multi-chip module (MCM). A variety of computing devices use the processing node 502 such as a desktop computer, a laptop computer, a server computer, a tablet computer, a smartphone, a gaming device, a smartwatch, and so on.

The power supply unit 545 provides the power supply reference level 590 and the standby power supply reference level 594 to the power controller 540. In another implementation, the processing node 502 includes a voltage regulator separate from the power controller 540 that receives the power supply reference level 590 and the standby power supply reference level 594. The power supply reference level 592 is based on the power supply reference level 590, and it is possible for the power controller 540 to turn off the power supply reference level 592. For example, the power controller 540 is capable of sending particular control signals to power switches that disconnect the disconnect the power supply reference level 592 from a physical voltage plane corresponding to the power supply reference level 590.

Although a single power supply reference level 592 is shown, in other implementations, any number of power supply reference levels are generated by the voltage regulator (not shown) for use by the other circuitry of the processing node 502 such as at least the clients 510, the communication fabric 520, the memory controller 530, and the link interfaces 542. In various implementations, the power controller 540 determines one of multiple available voltage magnitudes to use for the power supply reference level 592 based on a selected performance state (P-state). The persistent on-chip memory 514 receives the standby power supply reference level 594 that is not turned off. The standby power supply reference level 594 is directly connected to a power plane that provides the standby power supply reference level 594 from the power supply unit 545. There are no power switches used for the standby power supply reference level 594. The standby power supply reference level 594 continually supplies a voltage magnitude to the persistent on-chip memory 514. In some implementations, the persistent on-chip memory 514 utilizes one of a variety of types of on-chip SRAM, but the persistent on-chip memory 514 is not used as part of any cache memory subsystem. Rather, in various implementations, only the security processor 513 accesses data stored within the persistent on-chip memory 514.

In the illustrated implementation, clients 510 include central processing unit (CPU) 512, graphics processing unit (GPU) 515 and Hub 516. Hub 516 is used for communicating with Multimedia Engine 518. The CPU 512, GPU 515 and Multimedia Engine 518 are examples of computing resources capable of processing applications. Although not shown, in other implementations, other types of computing resources are included in clients 510. Each of the one or more processor cores in CPU 512 includes circuitry for executing instructions according to a given selected instruction set architecture (ISA). In various implementations, each of the processor cores in CPU 512 includes a superscalar, multi-threaded microarchitecture used for processing instructions of the given ISA. In an implementation, GPU 515 includes a high parallel data microarchitecture with a significant number of parallel execution lanes. In one implementation, the microarchitecture uses single-instruction-multiple-data (SIMD) pipeline for the parallel execution lanes. Multimedia Engine 518 includes processors for processing audio data and visual data for multimedia applications.

In an implementation, the CPU 512 includes a security processor 513 that accesses copies of boot firmware stored in the persistent on-chip memory 514. However, in other implementations, the GPU 515 or other type of client includes dedicated circuitry to implement the security processor 513. In various implementations, the security processor 513 performs the functionality of the security processor 120 (of FIG. 1), and the persistent on-chip memory 514 performs data storage and is used in techniques in a same manner as the persistent on-chip memory 130 (of FIG. 1). Therefore, the computing system 500 supports reducing the transitions between an active state and a sleep state of the processing node 502.

In some implementations, the communication fabric 520 transfers traffic back and forth between clients 510 and memory controller 530 and includes interfaces for supporting respective communication protocols. The communication fabric 520 includes at least queues for storing requests and responses, selection circuitry for arbitrating between received requests before sending requests across an internal network, packing circuitry for building and decoding packets, and control circuitry for selecting routes for the packets.

Although a single memory controller 530 is shown, in other implementations, another number of memory controllers are used in the processing node 502. The memory controller 530 receives memory requests from clients 510 via the communication fabric 520, schedules the memory requests, and sends the scheduled memory requests to one or more of system memory and main memory. Memory controller 530 also receives responses from system memory (implemented by DRAM 560) and main memory (implemented by disk memory 570) and sends the responses to a corresponding source of the request in clients 510. The memory controller 530 also supports one or more memory interface protocols. A protocol determines values used for information transfer, such as a number of data transfers per clock cycle, signal voltage levels, signal timings, signal and clock phases and clock frequencies. In various implementations, system memory, such as DRAM 560, is filled with data from main memory through the I/O controller and bus 572 and the memory bus 550. A corresponding cache fill line with the requested block is conveyed from main memory, such as disk memory 570, to a corresponding one of the cache memory subsystems in clients 510 in order to complete the original memory request. The cache fill line is placed in one or more levels of caches.

The address space of processing node 502 is divided among at least CPU 512, GPU 515 and Hub 516 and one or more other components such as input/output (I/O) peripheral devices (not shown) and other types of computing resources. Memory maps are maintained for determining which addresses are mapped to which component, and hence to which one of CPU 512, GPU 515 and Hub 516 a memory request for a particular address should be routed. In some implementations, main memory, such as disk memory 570, is one of a variety of types of non-volatile, random access secondary storage of data. Examples of main memory are hard disk drives (HDDs) and solid-state disks (SSDs).

Link interfaces 542 support communication between processing node 502 and other processing nodes by transferring messages on links. In various implementations, the messages sent across the links between nodes include an indication of an operating state for one or more nodes, a power down request, responses to requests, interrupts, and other information. In various implementations, each link is a point-to-point communication channel between two nodes. At the physical level, a link includes one or more lanes. In some implementations, link interfaces 542, the corresponding links, and other nodes include communication protocol connections such as PCIe (Peripheral Component Interconnect Express), InfiniBand, RapidIO, HyperTransport, and so forth. In some implementations, link interfaces 542 include control circuitry and buffers or queues used to communicate with other nodes via the interconnect links.

In one implementation, power controller 540 collects data from clients 510. In some implementations, power controller 540 also collects data from memory controller 530. In some implementations, the collected data includes predetermined sampled signals. The switching of the sampled signals indicates an amount of switched capacitance. Examples of the selected signals to sample include clock gating enable signals, bus driver enable signals, mismatches in content-addressable memories (CAM), CAM word-line (WL) drivers, and so forth. In an implementation, power controller 540 collects data to characterize power consumption in the processing node 502 during given sample intervals. On-die current sensors and temperature sensors in the processing node 502 also send information to power controller 540. Power controller 540 uses one or more of the sensor information, a count of issued instructions or issued threads, and a summation of weighted sampled signals to estimate power consumption for the processing node 502. Power controller 540 decreases (or increases) power consumption if the processing node 502 is operating above (below) a threshold limit. In some implementations, power controller 540 selects a respective power-performance state (P-state) for each of the computing resources in clients 510. The P-state includes at least an operating voltage and an operating clock frequency. In addition, the power controller 540 determines whether the processing node 502 is placed in an active state or in a sleep state.

Figure 6:
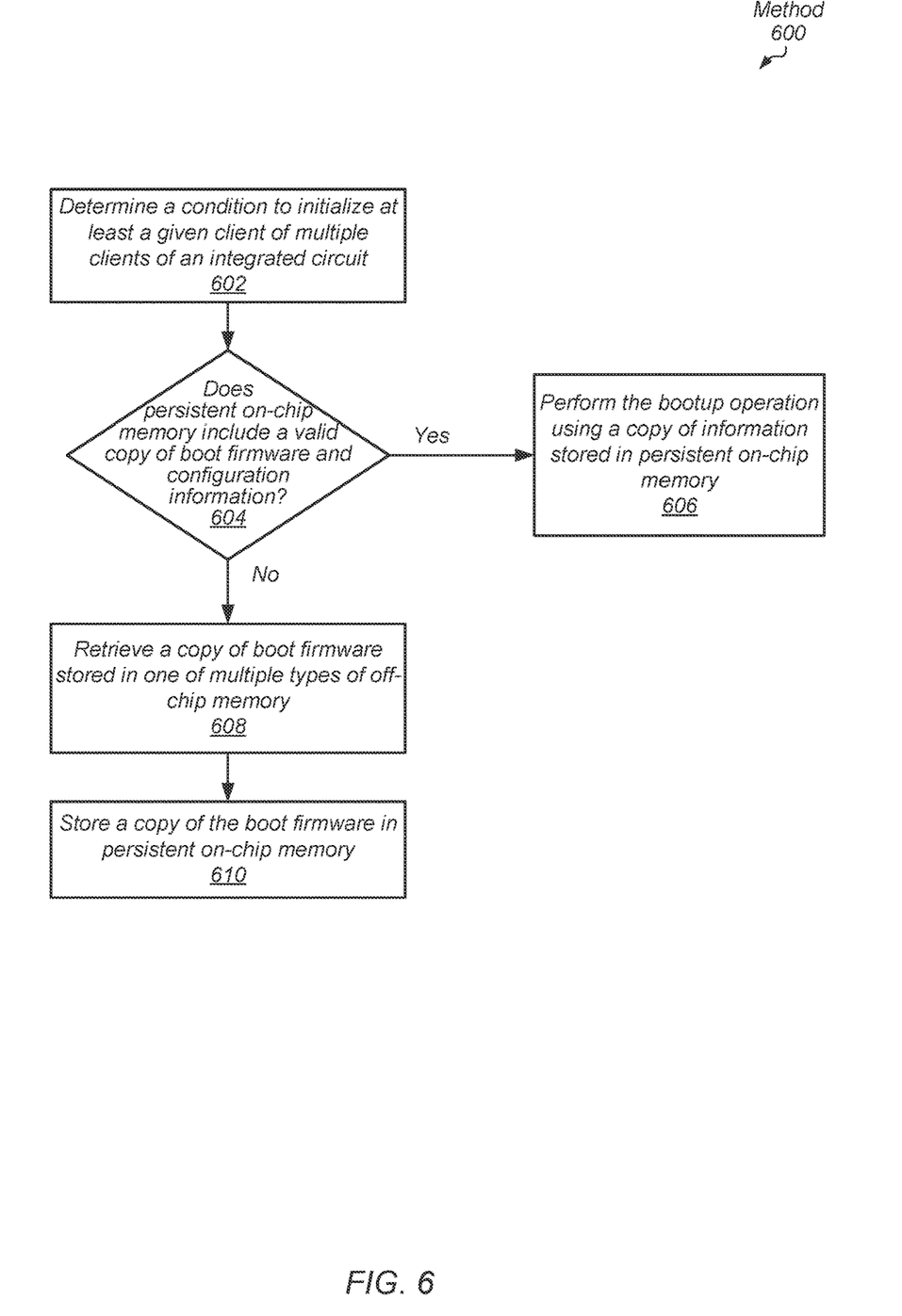
FIG. 6 is a generalized block diagram of a method for efficiently managing power consumption of multiple components of an integrated circuit.

Referring to FIG. 6, a generalized block diagram is shown of a method 600 for efficiently managing power consumption of multiple components of an integrated circuit. A security processor determines a condition to initialize at least a given client of multiple clients of an integrated circuit (block 602). Examples of the condition are a cold bootup operation, a warm bootup operation, and a resume operation. If the security processor determines that the persistent on-chip memory includes a valid copy of boot firmware and configuration information ("yes" branch of the conditional block 604), then the security processor performs the initialization steps independent of the operating system using copies of boot firmware and configuration information stored in persistent on-chip memory (block 606). If the security processor determines that the persistent on-chip memory does not include a valid copy of boot firmware and configuration information ("no" branch of the conditional block 604), then the security processor retrieves a copy of boot firmware stored in one of multiple types of off-chip memory (block 608). The security processor stores a copy of at least a subset of the boot firmware in persistent on-chip memory (block 610). In addition, the operating system performs the initialization steps for the multiple clients. The stored information, though, allows the security processor to perform the initialization steps for a subsequent resume operation.

When storing information in the persistent on-chip memory, the security processor retrieves copies of boot loaders and configuration information stored in one or more of multiple types of off-chip memory. The security processor selects at least a subset of information of the copies of boot loaders and configuration information. In an implementation, a particular client is a parallel data processing unit, and the subset of configuration information includes information for performing initialization steps such as setting up a frame buffer with a particular size and address range, setting up power management parameters to emphasize high performance or power consumption reduction, setting up modes of operation such as a default to a maximum operating clock frequency for all workloads or select the operating clock frequency based on a type of workload, and setting up configuration and status registers with values corresponding to a resolution supported by a connected display device.

Other examples of the subset of configuration information for the parallel data processing unit are information identifying a particular version of a software toolkit or platform used to support applications that run on the client and aid the client to utilize commands from another client, information identifying a particular bus interface and corresponding communication protocol parameters for accessing memory and/or communication with another client, and so forth. In various implementations, the security processor authenticates each of the boot firmware and the configuration information prior to using them and storing them in the persistent on-chip memory. As described earlier, in some implementations, the persistent on-chip memory has a limited size due to a limited amount of on-die area available for the persistent on-chip memory. In such implementations, the security processor also stores a subset of one or more of the boot firmware and the configuration information of the clients in the system memory. In such implementations, the system memory receives a standby power supply reference level. In yet other implementations, one or more of the power controller, the persistent on-chip memory, and the system memory includes timers used to determine when a measurement of the idle time since the suspend state began reaches or exceeds a threshold amount of time, and then one or more of the standby power supply reference levels are turned off for the persistent on-chip memory and the system memory.

Figure 7:
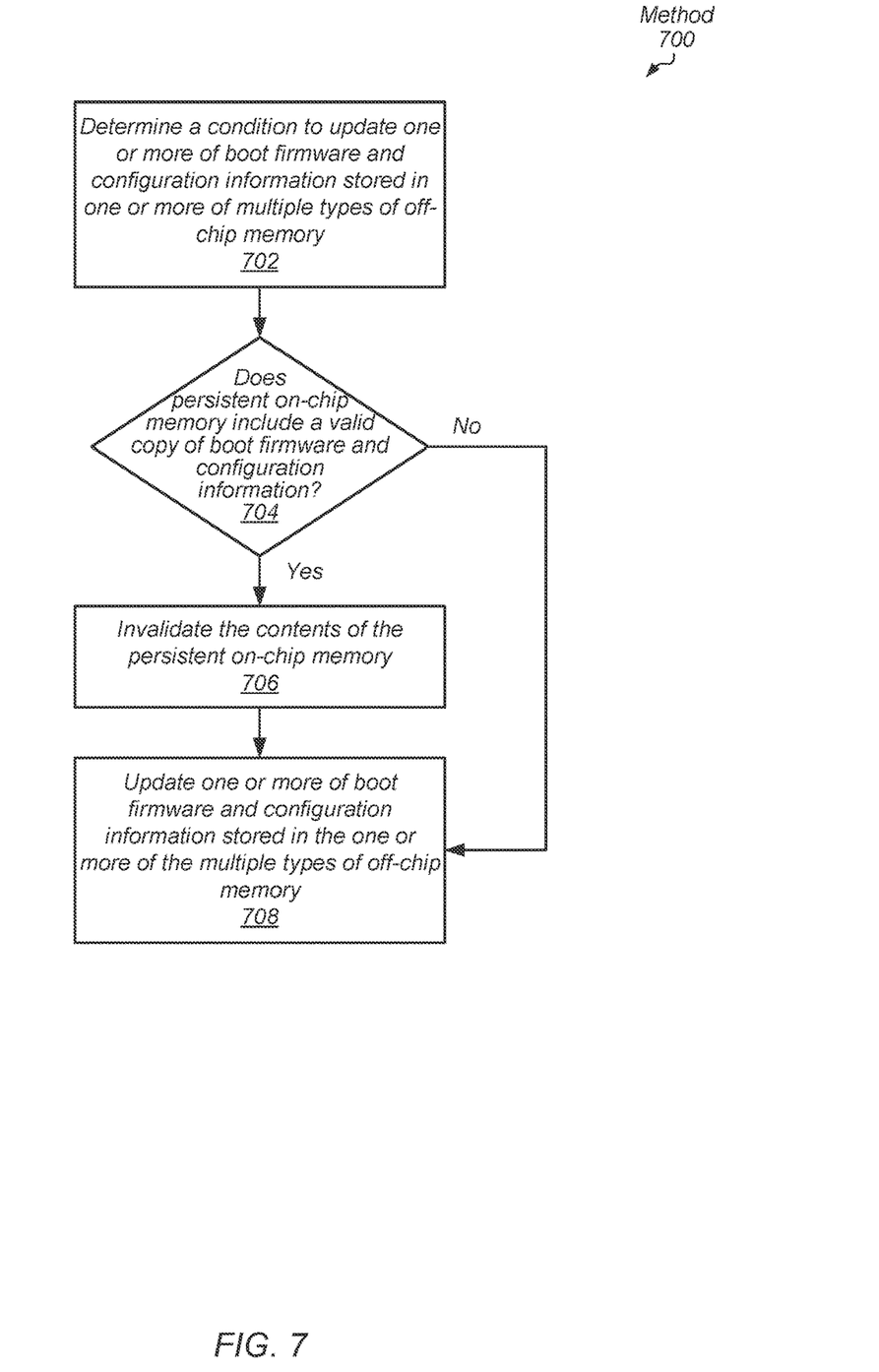
FIG. 7 is a generalized block diagram of a method for updating bootup and configuration information used by multiple components of an integrated circuit.

Turning now to FIG. 7, a generalized block diagram is shown of a method 700 for updating bootup and configuration information used by multiple components of an integrated circuit. A security processor detects (e.g., a condition) or otherwise determines an update procedure is indicated. For example, such a condition may indicate an update is to be performed using one or more of boot firmware and configuration information stored in one or more of multiple types of off-chip memory (block 702). The off-chip memory includes one or more of a variety of types of non-volatile ROMs, a variety of type of volatile DRAM, and non-volatile hard disk drives (HDDs) and solid-state disks (SSDs). If the security processor determines that persistent on-chip memory includes a valid copy of boot firmware and configuration information ("yes" branch of the conditional block 704), then the security processor invalidates the contents of the persistent on-chip memory (block 706). Afterward, the security processor or other circuitry updates one or more of boot firmware and configuration information stored in the one or more of the multiple types of off-chip memory (block 708). If the security processor determines that persistent on-chip memory does not include a valid copy of boot firmware and configuration information ("no" branch of the conditional block 704), then control flow of method 700 moves to block 708 where the security processor or other circuitry updates one or more of boot firmware and configuration information stored in the one or more of the multiple types of off-chip memory.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A security processor comprising:
   circuitry, wherein responsive to a first condition that indicates initialization of at least a first client of a plurality of clients of an integrated circuit, the circuitry is configured to:
      initialize the first client using configuration information stored in a persistent on-chip memory that is accessible by the circuitry and inaccessible by the plurality of clients, responsive to an indication that the persistent on-chip memory stores valid information.

2. The security processor as recited in claim 1, wherein the first condition comprises an indication of a transition of the integrated circuit from a sleep state to an active state.

3. The security processor as recited in claim 1, wherein the circuitry is further configured to perform a bootup operation using boot firmware stored in the persistent on-chip memory.

4. The security processor as recited in claim 3, wherein the circuitry is further configured to:
   retrieve the boot firmware from an off-chip memory;
   store a copy of the boot firmware in the persistent on-chip memory; and
   update a flag to indicate that the persistent on-chip memory stores valid information.

5. The security processor as recited in claim 1, wherein the circuitry is further configured to:
   retrieve data including the configuration information from an off-chip memory; and
   store a first subset of the data in the persistent on-chip memory.

6. The security processor as recited in claim 1, wherein responsive to a second condition that indicates an update procedure, the circuitry is further configured to invalidate contents of a persistent on-chip memory.

7. The security processor as recited in claim 1, wherein the circuitry is further configured to:
   perform authentication of update information corresponding to boot firmware and configuration information retrieved from an off-chip memory; and
   store a subset of the update information in the persistent on-chip memory.

8. A method, comprising:
   processing tasks by a plurality of clients of an integrated circuit; and
   responsive to a first condition that indicates initialization of at least a first client of the plurality of clients:
      initializing, by circuitry, the first client using configuration information stored in a persistent on-chip memory that is accessible by the circuitry and inaccessible by the plurality of clients, responsive to an indication that the persistent on-chip memory stores valid information.

9. The method as recited in claim 8, wherein the first condition comprises an indication of a transition of the integrated circuit from a sleep state to an active state.

10. The method as recited in claim 8, further comprising performing, by the circuitry, a bootup operation using boot firmware stored in the persistent on-chip memory.

11. The method as recited in claim 10, further comprising:
    retrieving, by the circuitry, the boot firmware from an off-chip memory;
    storing, by the circuitry, a copy of the boot firmware in the persistent on-chip memory; and
    updating, by the circuitry, a flag to indicate that the persistent on-chip memory stores valid information.

12. The method as recited in claim 8, further comprising:
    retrieving, by the circuitry, data including the configuration information from an off-chip memory; and storing, by the circuitry, a first subset of the data in the persistent on-chip memory.

13. The method as recited in claim 8, wherein responsive to a second condition that indicates an update procedure, the method further comprises invalidating, by the circuitry, contents of a persistent on-chip memory.

14. The method as recited in claim 8, further comprising turning off, by the circuitry, a power supply reference level used by the persistent on-chip memory, responsive to a threshold amount of time has elapsed since a most recent sleep state has begun.

15. A computing system comprising:
persistent on-chip memory configured to store data; and
a security processor comprising:
circuitry, wherein responsive to a first condition that indicates initialization of at least a first client of a plurality of clients of an integrated circuit, the circuitry is configured to:
initialize the first client using configuration information stored in a persistent on-chip memory that is accessible by the circuitry and inaccessible by the plurality of clients, responsive to an indication that the persistent on-chip memory stores valid information.

16. The computing system as recited in claim 15, wherein the first condition comprises an indication of a transition of the integrated circuit from a sleep state to an active state.

17. The computing system as recited in claim 15, wherein the circuitry is further configured to perform a bootup operation using boot firmware stored in the persistent on-chip memory.

18. The computing system as recited in claim 17, wherein the circuitry is further configured to:
retrieve the boot firmware from an off-chip memory;
store a copy of the boot firmware in the persistent on-chip memory; and
update a flag to indicate that the persistent on-chip memory stores valid information.

19. The computing system as recited in claim 15, wherein the circuitry is further configured to:
retrieve data including the configuration information from an off-chip memory; and
store a first subset of the data in the persistent on-chip memory.

20. The computing system as recited in claim 15, wherein responsive to a second condition that indicates an update procedure, the circuitry is further configured to invalidate contents of a persistent on-chip memory.

* * * * *